US011146975B2

(12) United States Patent
Frenger et al.

(10) Patent No.: US 11,146,975 B2
(45) Date of Patent: Oct. 12, 2021

(54) NETWORK NODE AND METHODS THEREIN FOR SELECTING SYSTEM INFORMATION AREA IDENTITIES IN A WIRELESS COMMUNICATIONS NETWORK

(71) Applicant: TELEFONAKTIEBOLAGET LM ERICSSON (PUBL), Stockholm (SE)

(72) Inventors: Pål Frenger, Linköping (SE); Johan Rune, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/770,391

(22) PCT Filed: Dec. 7, 2017

(86) PCT No.: PCT/SE2017/051232
§ 371 (c)(1),
(2) Date: Jun. 5, 2020

(87) PCT Pub. No.: WO2019/112500
PCT Pub. Date: Jun. 13, 2019

(65) Prior Publication Data
US 2020/0389802 A1    Dec. 10, 2020

(51) Int. Cl.
H04W 36/00 (2009.01)
H04W 24/02 (2009.01)
(Continued)

(52) U.S. Cl.
CPC ........... *H04W 24/02* (2013.01); *H04W 24/04* (2013.01); *H04W 24/10* (2013.01); *H04W 48/16* (2013.01)

(58) Field of Classification Search
CPC ..... H04W 24/02; H04W 24/04; H04W 24/10; H04W 28/04; H04W 48/16; H04W 72/04;
(Continued)

(56) References Cited

U.S. PATENT DOCUMENTS

2010/0291934 A1    11/2010    Lope
2015/0223073 A1    8/2015    Peng et al.
(Continued)

FOREIGN PATENT DOCUMENTS

WO    2013103311 A    7/2013
WO    WO2014056307    4/2014

OTHER PUBLICATIONS

Jarnberg, Anders, International Search Report, PCT/SE2017/051232, Stockholm, Sweden, dated Oct. 31, 2018.
(Continued)

*Primary Examiner* — Temica M Beamer
(74) *Attorney, Agent, or Firm* — Ericsson Inc.

(57) ABSTRACT

A method performed by a network node for selecting a System Information Area Identity, SI Area ID, for a first cell in a wireless communications network. The network node obtains (202) information about SI configurations of one or more respective cells in a set of cells relevant to the first cell. The network node determines (203) a set of candidate SI Area IDs for the first cell. The network node then calculates (204) a value of a utility function for each respective SI Area ID candidate in the set of candidate SI Area IDs based on the obtained information about the SI configurations of the one or more respective cells in the set of cells relevant to the first cell. The network node then selects (205) an SI Area ID for the first cell from the set of candidate SI Area IDs based on the calculated utility function values, which selected SI Area ID is for configuration of the first cell.

19 Claims, 10 Drawing Sheets

(51) Int. Cl.
*H04W 24/04* (2009.01)
*H04W 24/10* (2009.01)
*H04W 48/16* (2009.01)

(58) Field of Classification Search
CPC ... H04W 72/042; H04W 36/30; H04W 36/18; H04W 36/14; H04W 36/12; H04W 36/08; H04W 36/0083; H04W 36/0055
USPC .................................. 455/436, 437, 438, 439
See application file for complete search history.

(56) References Cited

U.S. PATENT DOCUMENTS

2017/0251500 A1 8/2017 Agiwal et al.
2017/0311217 A1* 10/2017 Jung ..................... H04W 48/08

OTHER PUBLICATIONS

Report of 3GPP TSG RAN WG2 meeting #98 R2-1707601, Hangzhou, China, May 15-19, 2017.
3GPP Draft; R2-1708908 SI valid area configuration, Aug. 20, 2017 3rd Generation Partnership Project (3GPP), Mobile Competence Centre; 650, route des Lucioles; F-06921 Sophia-Antipolis Cedex; France, vol. RAN WG2, No. Berlin, Germany.
3GPP Draft; R2-1708069 Area ID and value tag for SIBs, Aug. 20, 2017 3rd Generation Partnership Project (3GPP), Mobile Competence Centre; 650, route des Lucioles; F-06921 Sophia-Antipolis Cedex; France, vol. Ran WG2, No. Berlin, Germany.

* cited by examiner

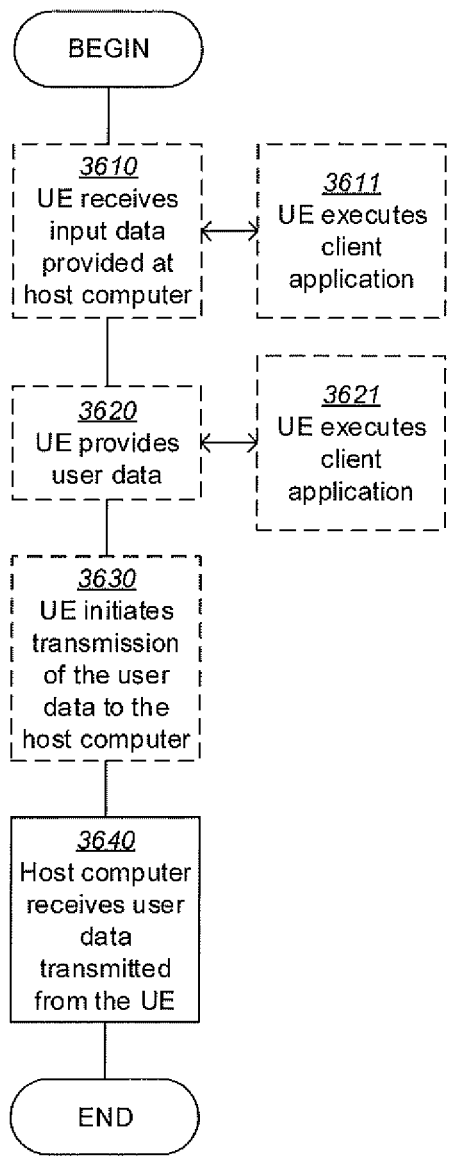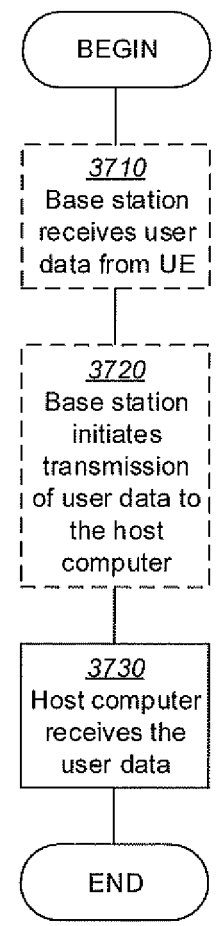
Fig. 11
Fig. 12

NETWORK NODE AND METHODS THEREIN FOR SELECTING SYSTEM INFORMATION AREA IDENTITIES IN A WIRELESS COMMUNICATIONS NETWORK

TECHNICAL FIELD

Embodiments herein relate to a network node and methods therein. In particular, they relate to selecting System Information Area Identities in a wireless communications network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, which may also be referred to as a sector, a beam or a beam group, with each service area or cell area being served by a radio network node such as a radio access node e.g., a Wi-Fi access point or a radio base station (RBS), which in some networks may also be denoted, for example, a "NodeB", "eNodeB", "gNB" or "gNodeB". A service area or cell area is a geographical area where radio coverage is provided by the radio network node. The term "cell" is also often used to refer to the radio transmissions which have the purpose of covering the cell area, e.g. radio signals transmitted from a network node that is responsible for the cell or serving the cell and/or controlling the cell. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipment. In a forum known as the Third Generation Partnership Project (3GPP), telecommunications suppliers propose and agree upon standards for future generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within 3GPP and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted as the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In 5G, a New Radio (NR) system is being standardized by 3GPP. The design goal of NR is to support lean carrier operation, where only necessary information is transmitted, preferably in a dedicated manner to the UE. This has a large impact on the design of the System Information (SI) mechanisms for NR, as SI in general is always transmitted and broadcasted to all UEs in a cell. Furthermore, SI and initial access design is not as easy to modify or enhance in later releases as features requiring primarily dedicated signaling.

To minimize the amount of SI broadcast in NR, the RAN working group (RAN WG2) of 3GPP has agreed to let the principles for distribution of SI in NR be partly different from the principles used in LTE. To this end, on-demand delivery of parts of the SI is introduced in NR.

Furthermore, for NR, it has been decided to divide the SI into "minimum SI" and "other SI", where the minimum SI is the SI that is required to access the cell. The minimum SI is periodically broadcasted in a cell, while the "other SI" may be either periodically broadcast or delivered on demand, e.g. triggered by a random access preamble (also referred to as Msg1) or a random access message 3 (also referred to as Msg3).

More specifically, in RAN2 Chairman notes, 3GPP TSG-RAN WG2 Meeting #98, Hangzhou, China, 15th-19 May 2017, 3GPP has agreed in relation to SI in NR that there will be at least a value tag and an Area ID, where a value tag is associated to each System Information Block (SIB), at least to SIBs of the "other SI". The value tag may be valid in only one cell or when combined with an Area ID it may be valid in more than one cell. Therefore, cells in NR will belong to an SI Area having an SI Area ID.

The SI Area ID is used to further reduce the amount of SI that needs to be transmitted in NR. By defining that certain SIBs are valid in the SI Area and not only in the cell which is the scope of SIBs in LTE, the UE does not need to acquire that SIB as often. When the UE enters a new cell belonging to the same SI Area ID as a previously visited cell, it may verify that certain SIBs it has already received and stored are valid also in this new cell. For on-demand SI, this may greatly reduce the number of SI transmission requests a UE needs to perform. Examples of SIBs that may be valid in multiple cells are e.g. SIBs containing list of frequency bands for other Radio Access Technologies (RATs) that an operator has deployed, or SIBs containing configuration of device-to-device communication parameters.

When deploying a new cell, the cell has to be configured with proper parameters. One of the most fundamental parameters a cell has is the Physical Cell Identity (PCI) which determines e.g. scrambling and DeModulation Reference Signal (DMRS) sequences used by the cell. The PCI is also used in e.g. Radio Resource Management (RRM)

measurements of different kinds. The PCI needs to be locally unique in the radio network and for that reason PCI conflict detection and resolution algorithms are implemented. In LTE there are algorithms for automatic PCI configuration and neighbor cell relation establishment. These algorithms may be modified to work also for NR.

In NR, the determination of SI Area IDs for cells is by manual configuration. This is work intensive, error prone, and drives operational cost.

SUMMARY

It is an object of embodiments herein to improve SI Area Configuration in a wireless communications network.

According to a first aspect of embodiments herein, the object is achieved by a method performed by a network node for selecting an SI Area ID for a first cell in a wireless communications network. The network node obtains information about SI configurations of one or more respective cells in a set of cells relevant to the first cell. After determining a set of candidate SI Area IDs for the first cell, the network node calculates a value of a utility function for each respective SI Area ID candidate in the set of candidate SI Area IDs based on the obtained information about the SI configurations of the one or more respective cells in the set of cells relevant to the first cell. Further, the network node selects an SI Area ID for the first cell from the set of candidate SI Area IDs based on the calculated utility function values, which selected SI Area ID is for configuration of the first cell.

According to a second aspect of embodiments herein, the object is achieved by a network node for selecting an SI Area ID for a first cell in a wireless communications network. The network node is configured to:
 obtain information about SI configurations of one or more respective cells in a set of cells relevant to the first cell;
 determine a set of candidate SI Area IDs for the first cell;
 calculate a value of a utility function for each respective SI Area ID candidate in the set of candidate SI Area IDs based on the obtained information about the SI configurations of the one or more respective cells in the set of cells relevant to the first cell; and
 select an SI Area ID for the first cell from the set of candidate SI Area IDs based on the calculated utility function values, which selected SI Area ID is for configuration of the first cell.

By calculating a value of a utility function for each respective SI Area ID candidate in the set, and using the calculated utility function values as a basis when selecting an SI Area ID for the first cell from the set of candidate SI Area IDs, the selected SI Area ID may be used for configuration of the first cell in a fast and simple way resulting, for example, in reduced operational costs for a network operator, and an improved SI Area Configuration in the wireless communications network.

A further advantage of embodiments herein is that it leads to a more reliable and less error-prone SI Area ID selection for cells in a wireless communication network 100 as compared to a manual selection and configuration.

BRIEF DESCRIPTION OF THE DRAWINGS

Examples of embodiments herein are described in more detail with reference to attached drawings in which:

FIGS. 9 to 12 are flowcharts illustrating methods implemented in a communication system including a host computer, a base station and a user equipment.

DETAILED DESCRIPTION

Figure 1:
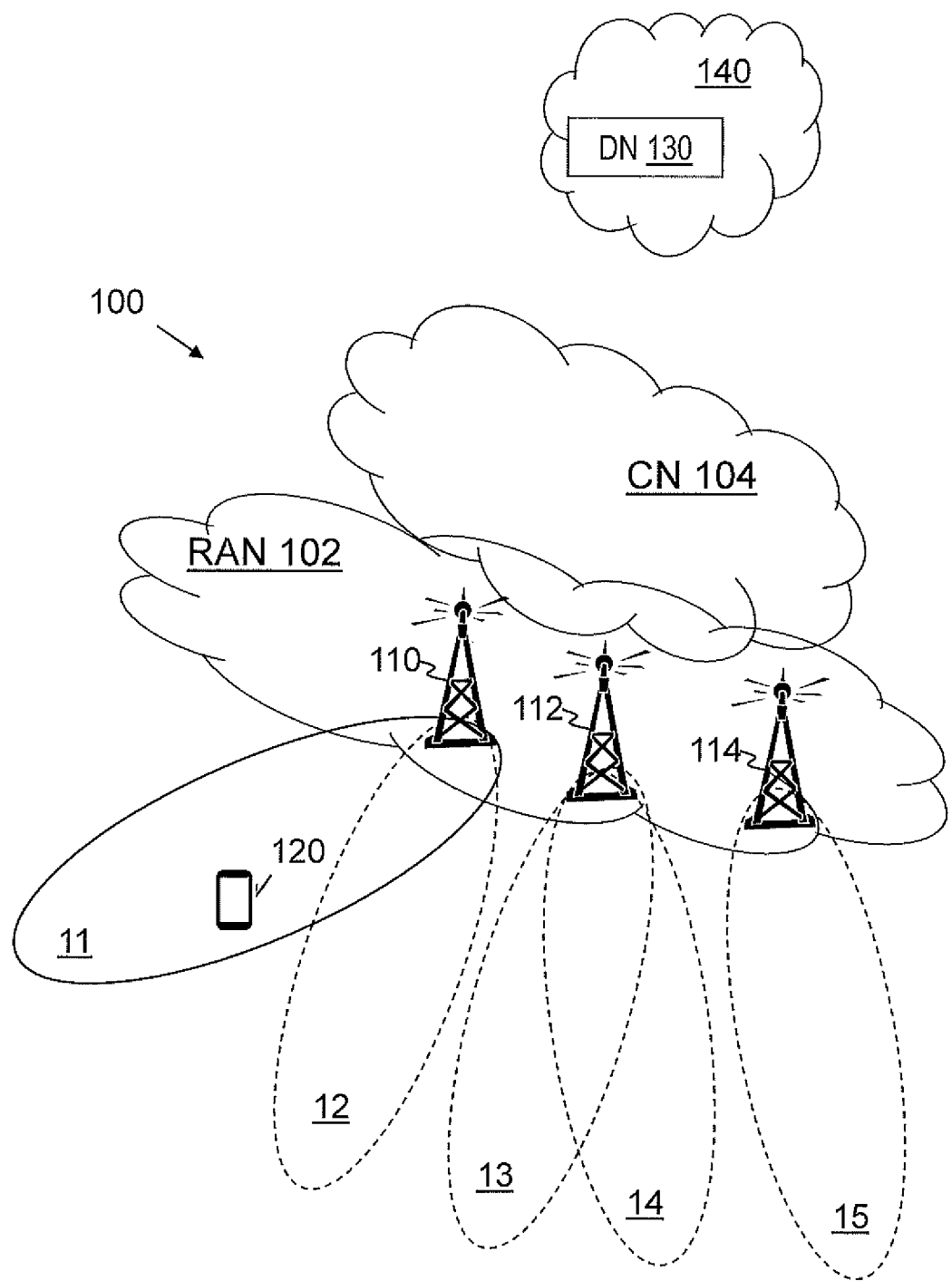
FIG. 1 is a schematic block diagram illustrating embodiments of a wireless communications network.

A wireless communications network 100, in which embodiments herein may be implemented, is schematically illustrated in FIG. 1.

The wireless communication network 100 comprises one or more RANs, e.g. a RAN 102, and one or more CNs, e.g. a CN 104. The wireless communications network 100 may be a cellular communications network, and may use a number of different technologies, such as LTE, LTE-Advanced, 5G, WCDMA, Global System for Mobile communications/enhanced Data rate for GSM Evolution (GSM/EDGE), NB-IoT, just to mention a few possible implementations. Embodiments herein relate to recent technology trends that are of particular interest in a 5G context, however, embodiments are also applicable in further development of the existing wireless communication systems such as e.g. WCDMA and LTE.

One or more network nodes such as network nodes 110, 112, 114, operate in the wireless communications network 100 such as e.g. in the RAN 102. The network nodes such as the network nodes 110, 112, 114 provide radio coverage over a respective geographical area, which may also be referred to as one or more cells 11, 12, 13, 14, 15. The network node 110 provides the cells 11 and 12, the network node 112 provides the cells 13 and 14, and the network node 114 provides the cell 15. Thus, each network node 110, 112, 114 may e.g. provide a cell such as e.g., a cluster, a sector, a beam or a beam group, of a Radio Access Technology (RAT), such as 5G, LTE, Wi-Fi or similar. The network nodes 110, 112, 114 may each be a transmission and reception point e.g. a radio access network node such as a Wireless Local Area Network (WLAN) access point or an Access Point Station (AP STA), an access controller, a base station, e.g. a radio base station such as a NodeB, an evolved NodeB (eNB, eNodeB), a gNodeB, a base transceiver station, a radio remote unit, an Access Point Base Station, a base station router, a transmission arrangement of a radio base station, a stand-alone access point or any other network unit capable of communicating with a UE, such as a UE 120, within the service area served by the respective network nodes 110, 112, 114 depending e.g. on the radio access technology and terminology used. The network node 110 may be referred to as a serving radio network node and communicate with the UE 120 with Downlink (DL) transmissions to the UE 120 and Uplink (UL) transmissions from the UE 120. Other examples of the network nodes 110, 112, 114 are Multi-Standard Radio (MSR) nodes such as MSR BS, network controllers, Radio Network Controllers (RNCs), Base Station Controllers (BSCs), relays, donor nodes controlling relay, Base Transceiver Stations (BTSs), Access Points (APs), transmission points, transmission nodes, Remote Radio Units (RRUs), Remote Radio Heads (RRHs), nodes in Distributed Antenna System (DAS) etc.

In the wireless communications network 100, wireless devices such as e.g. a UE 120 operate. The UE 120 may be any wireless device such as e.g. a mobile station, a non-Access Point (non-AP) STA, a STA, a user equipment and/or a wireless terminal, communicate via one or more RANs such as the RAN 102, to one or more CNs such as the CN 104. Thus, the UE 120 is operating in the wireless communications network 100.

It should be understood by the skilled in the art that "UE" is a non-limiting term which means any wireless device, terminal, communications device, wireless communication terminal, user equipment, Machine-Type Communication (MTC) device, Device-to-Device (D2D) terminal, Machine-to-Machine (M2M) device, or node e.g. smart phone, laptop, mobile phone, sensor, relay, mobile tablets, an Internet-of-Things (IoT) device, e.g. a Cellular IoT (CIoT) device or even a small base station communicating within a service area.

Please note the term UE used in this document also covers other wireless devices such as M2M devices, and IoT devices even though they do not have any user.

Some actions in methods herein are performed by the network node 110. As an alternative, any Distributed network Node (DN) 130 and functionality, e.g. comprised in a cloud 140 may be used for performing these actions.

According to some embodiments herein, the network node 110 selects an SI Area ID for a first cell 11 based on calculating a value of a utility function for one or more candidate SI Area IDs and then selects the SI Area ID e.g. resulting in the largest utility. This allows for the network node 110 to determine a suitable SI Area ID for a cell e.g. by selecting the SI Area ID resulting in the largest utility. Such utility function value calculations may be based on SI similarity between cells in the SI Area, neighbor cell information, etc.

Some Terminology Used Herein

A set of cells relevant to the first cell 11 when used herein e.g. means the cells belonging to the SI Areas neighbouring the first cell 11, wherein an SI Area neighbouring the first cell 11 is an SI Area which does not comprise the first cell 11, but in which at least one cell is a neighbour of the first cell 11. In cases where the first cell 11 already belongs to an SI Area, the set of cells relevant to the first cell 11 further comprises the cells of the SI Area of the first cell 11.

A neighbour relation between two cells when used herein e.g. means that a UE may be handed over from one of the cells to the other. Typically, it may also mean that a neighbour relation has been established, such that e.g. one of the cells may be listed as a neighbour cell in a neighbour cell list, e.g. provided via system information, in the other cell and vice versa. That two cells have a neighbour relation may also be expressed such that the two cells are neighbours of each other, that they are neighbour cells, that they are neighbouring each other or that one of the cells neighbours the other. That two network nodes, e.g. two gNBs, have a neighbour relation may e.g. be interpreted in at least two ways. One interpretation is that at least one cell of one of the network nodes has a neighbour relation with at least one cell of the other network node. Another interpretation is that the two network nodes have established an inter-network node, e.g. an inter-gNB, interface between each other, e.g. an Xn interface between two gNBs.

SI configuration when used herein e.g. means a certain combination of SI parameter values. In other words, this may for example be seen as an instantiation of the system information, such that each system information parameter has been assigned a certain value. For example, an SI configuration may refer to the entire system information, i.e. all system information parameters, of a cell, but in some cases it may refer to a part of the system information, i.e. a subset of the system information parameters. Note that in principle the SI Area ID is a part of the system information and hence a part of the SI configuration of a cell, when the SI configuration refers to the entire system information. However, the SI Area ID may sometimes be treated as if it was separate from the system information.

Candidate SI Area IDs for the first cell 11 when used herein e.g. means SI Area IDs which are considered for assignment to the first cell 11. These candidate SI Area IDs comprise the SI Area IDs of the cells having neighbour relations with the first cell 11 as well as another arbitrary SI Area ID. The "another arbitrary SI Area ID" may be any SI Area ID which is not used by any of the SI Areas of the cells neighbouring to the first cell 11 and/or is not used by any other SI Area within a certain reuse distance, where the reuse distance may ensure that conflict situations or situations of ambiguity do not arise, i.e. the reuse distance may ensure that an SI Area ID is locally unique or at least locally unique, and is typically a matter of configuration and/or operator preference. In principle, this therefore means that in some scenarios, all or any SI Area ID may be a candidate SI Area ID of the first cell 11. However, the bulk of the candidate SI Area IDs may then for example be all the SI Area IDs matching the designation "another arbitrary SI Area ID", but within this group of SI Area IDs, the SI Area IDs are not considered individually for assignment to the first cell 11, but may rather together be regarded as a single candidate SI Area ID alternative. The "another arbitrary SI Area ID" may thus be seen as a single "wild card SI Area ID" when considered as a candidate SI Area ID. A candidate SI Area ID may also be referred to as an SI Area ID candidate.

Locally unique when used to denote a property of an SI Area ID herein e.g. means that the same SI Area ID is not used by any other SI Areas within a certain reuse distance, where the reuse distance may ensure that conflict situations or situations of ambiguity do not arise, i.e. the reuse distance may ensure that an SI Area ID is locally unique or at least locally unique, and is e.g. a matter of configuration and/or operator preference. Local uniqueness of an SI Area ID may also be ensured by making the SI Area ID unique within an existing larger area definition, for example a Tracking Area or a RAN Notification Area.

A utility function when used herein e.g. means a mathematical and/or logical function or an algorithm, which, based on a set of input parameter values produces a utility value, where utility value refers to a value that is a measure of the usefulness of the set of input parameter values. Herein, the set of input parameters are associated with a candidate SI Area ID and hence the utility value or measure of usefulness of the set of input parameters is equivalent to, or may be seen as or may be translated to, a utility value or measure of usefulness of the candidate SI Area ID with which the set of input parameter values are associated.

A largest utility when used herein e.g. means the greatest utility value, i.e. the greatest measure of usefulness, i.e. the greatest usefulness. This term is e.g. used in the context of selection of one of the candidate SI Area IDs of a cell, wherein a utility function has been used to produce a utility value for each of the candidate SI Area IDs of the cell.

Figure 2:
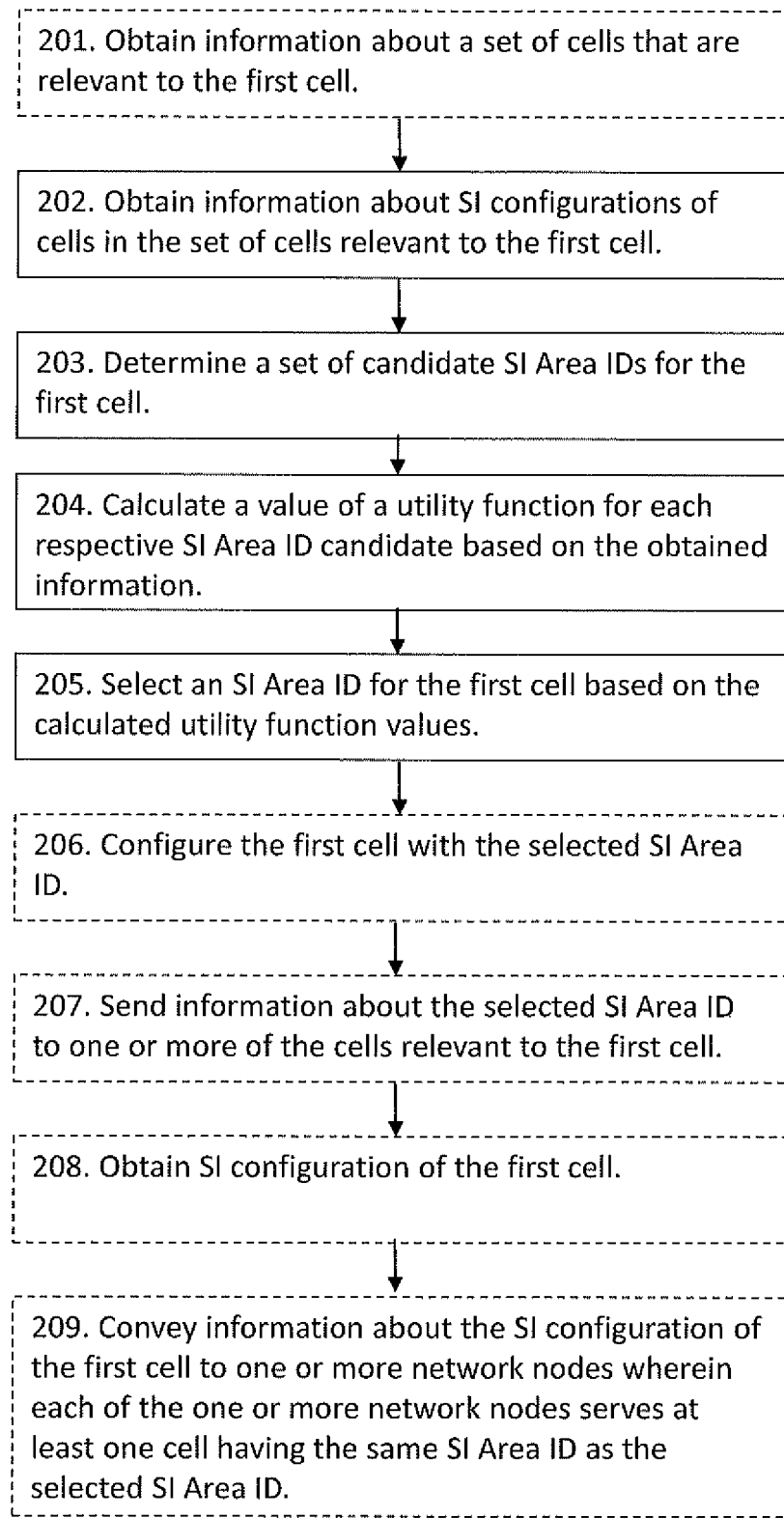
FIG. 2 is a flowchart depicting embodiments of a method in a network node.

Example embodiments of a method performed by a network node 110 for selecting a System Information Area Identity (SI Area ID) for the first cell 11 in a wireless communications network 100, will now be described with reference to a flowchart depicted in FIG. 2. The method will first be described in a view seen from the network node 110 together with FIG. 2, followed by more detailed explanations and examples.

The method comprises the following actions, which actions may be combined and/or taken in any suitable order. Actions that are optional are presented in dashed boxes in FIG. 2.

Action 201

The network node 110 will in Action 202 obtain information about SI configurations of one or more respective cells in a set of cells relevant to the first cell. This may be preceded by the optional Action 201. In order for the network node 110 to select an SI Area ID for a first cell 11 in a wireless communications network 100, the network node 110 needs information on which cells that are relevant to the first cell 11.

The network node 110 obtains information about a set of cells that are relevant to the first cell 11, from any one out of: the network node 110 itself, and other network nodes.

The obtained information may be based on an automatic neighbor relation (ANR) mechanism or algorithm or on input from an operation and maintenance (O&M) node, e.g. an Operations Support System (OSS) node.

Action 202

The network node 110 further needs some information about SI configurations of the cells relevant to the first cell 11. This is to be able to compare the SI configurations of these cells with the SI configuration of the first cell 11 so that similarities, e.g. parameters with the same value, may be identified and possibilities to compress multi-cell system information may be assessed. Note that in principle the SI Area ID is a part of the system information and hence a part of the SI configuration of a cell. However, the SI Area ID may sometimes be treated as if it was separate from the system information. If not already achieved in Action 201, the network node 110 will be aware of the SI Area IDs of the cells relevant to the first cell 11 after performing Action 202.

The network node 110 obtains information about SI configurations of one or more respective cells in the set of cells relevant to the first cell 11.

Such SI configurations may be requested by the network node 110 from the relevant cells, and may as well be provided by the O&M system.

The method for selecting an SI Area ID for a first cell 11 may e.g. be implemented in a distributed or centralized manner. For example, a distributed implementation may involve that the network node 110 collects SI configurations from the one or more network nodes controlling the one or more respective cells in the set of cells relevant to the first cell 11 such as e.g. from all cells in an SI Area e.g. via an X2/Xn/S1/Ng interface or a 5G RAN-CN interface corresponding to S1 in LTE or similar. A centralized implementation may involve communication of SI parameters of neighboring cells to a central node in the network.

Action 203

In order for the network node 110 to select the suitable SI Area ID for the first cell 11, the network node 110 will identify a set of candidate SI Area IDs. This is to be able to evaluate the candidate SI Area IDs and compare their suitability with each other to be able to have a basis for selecting one of them.

The network node 110 thus determines a set of candidate SI Area IDs for the first cell 11. This may be performed by collecting the SI Area IDs of the set of cells relevant to the first cell 11. Together with the "wild card SI Area ID" representing any other locally unique SI Area ID, these SI Area IDs form the set of candidate SI Area IDs.

In some embodiments, the set of candidate SI Area IDs for the first cell 11 thus comprises SI Area IDs associated with the cells relevant to the first cell 11 and other unused SI Area IDs.

In other embodiments, the set of candidate SI Area IDs for the first cell 11 comprises SI Area IDs of cells having a neighbour relation with the first cell 11.

Action 204

The different candidate SI Area IDs for the first cell 11 will then be evaluated by the network node 110.

Therefore, the network node 110 calculates a value of a utility function for each respective SI Area ID candidate in the set of candidate SI Area IDs. This is performed based on the obtained information about the SI configurations of the one or more respective cells in the set of cells relevant to the first cell 11.

The utility function that is used for calculating a utility value for each respective SI Area ID candidate in the set of candidate SI Area IDs, may be an algorithm or a mathematical function with input parameters, e.g. in the form of a weighted combination of factors and/or terms comprising one or more of:

- a measure of SI resemblance between the first cell 11 and the set of cells relevant to the first cell 11 having the same SI Area ID,
- number of direct neighbours to the first cell 11,
- cell types,
- expected handover frequency,
- measures related to the association of the first cell 11 in relation to areas of the wireless communications network 100, and
- measures related to the association of the first cell 11 in relation to network nodes other than the network node 110 of the wireless communications network 100.

In some embodiments, the utility function value calculations may be based on SI Area sizes, where the size of an SI Area may be measured as the number of cells belonging to the SI Area, or other areas that the cell 11 belongs to, e.g., tracking area, location area, routing area, RAN area, RAN Notification Area, etc. In other embodiments, such utility function value calculations may, for example, prohibit or discourage the network node 110 from configuring the same SI Area ID to cells belonging to different tracking areas.

In one example, these utility function value calculations may be based on which other network nodes that are associated with the first cell 11, e.g. radio network controller, serving gateway, mobility management entity (MME), Access and Mobility Function (AMF), such that e.g. cells with the same SI Area ID also are guaranteed or are very likely to be configured with the same other network node, e.g. the same MME or the same AMF.

Action 205

With the utility function value calculation for each respective SI Area ID candidate, the network node 110 has a good input for selecting a suitable SI Area ID for the first cell 11.

The network node 110 thus selects an SI Area ID for the first cell 11 from the set of candidate SI Area IDs based on the calculated utility function values, which selected SI Area ID is for configuration of the first cell 11.

In some embodiments, a Self-Organizing Network and/or Self-Optimizing Network (SON) mechanism determines a suitable SI Area ID for a cell by selecting the SI Area ID resulting in the largest utility.

In some other embodiments, selecting SI Area IDs for cells is carried out periodically in the wireless communications network 100, e.g., each network node such as e.g. the network nodes 110, 112, and 114 repeatedly evaluates the SI Area ID association of its' cells, or event triggered, e.g., when new cells are installed in the wireless communications network.

Action 206

The information on the selected SI Area ID may be sent to another node, e.g. OSS node or an O&M node, for configuring the first cell 11. However, this configuration may be carried out by the network node 110 itself.

The network node 110 configures the first cell 11 with the selected SI Area ID.

In some embodiments, the network node 110 configures the first cell 11 with the selected SI Area ID by sending a message comprising the selected SI Area ID configuration to one or more of the other network nodes such as e.g. another network node controlling the first cell 11. This may e.g. be the case if the network node 110 is a Central Unit (CU or gNB-CU) and the other network node controlling the first cell 11 is a Distributed Unit (DU or gNB-DU) of a split architecture NR gNB. Furthermore, in some embodiments, the network node 110 configures the first cell 11 with the selected SI Area ID by sending a message comprising the selected SI Area ID configuration to another node, such as an O&M node, e.g. an OSS node, which in turn conveys the selected SI Area ID to a network node controlling the first cell 11, which e.g. may require manual approval.

Action 207

It may be useful to spread the information about the selected SI Area ID to the cells relevant to the first cell 11. Thus, in some embodiments, the network node 110 sends information about the selected SI Area ID for the first cell 11 to one or more of network nodes serving the cells relevant to the first cell 11.

In one embodiment, this may be performed in an SI Area Update message containing the SI Area ID for the first cell 11.

Action 208

It may be useful to send the SI configuration of the first cell 11 to one or more network nodes.

Therefore, the network node 110 may obtain SI configuration of the first cell 11.

In one embodiment, this information is obtained from the network node serving the first cell and/or from another network nodes, e.g., an OSS node.

Action 209

The network node 110 may then elect which cells and serving network nodes that may benefit from information about the SI configuration of the first cell 11 and therefore preferably should be sent to.

Therefore, in some embodiments the network node 110 conveys information about the SI configuration of the first cell 11 to one or more network nodes wherein each of the one or more network nodes serves at least one cell having the same SI Area ID as the selected SI Area ID. Moreover, the information about the SI configuration of the first cell 11 further may comprise a command to forward the information to one or more network nodes wherein each of the one or more network nodes serves at least one cell having the same SI Area ID as the selected SI Area ID.

Embodiments herein will now be further described and exemplified. The text below is applicable to and may be combined with any suitable embodiment described above.

In some example embodiments, the cells such as the cell 11 in the wireless communications network 100 such as NR, may be configured with an SI Area ID that is at least "locally unique". Further, the SI Area ID may be unique within an existing area definition, for example a Tracking Area or a RAN Notification Area. However, and depending on the number of bits allowed to represent the SI Area ID in NR, it may be that the SI Area ID is globally unique.

In some other example embodiments, some of the SI valid in one cell may be valid also in other cells within the SI Area. Therefore, it may be beneficial that a cell belongs to an SI Area where cells have as similar SI as possible. The "other SI" in NR, for example, may potentially be given a larger area scope in case the information is the same in several cells in the SI Area.

Further, it is beneficial if a cell belongs to the same SI Area as most of its neighbors do since that will decrease the amount of SI acquisition that the UE 120 needs to perform when moving between cells in the wireless communications network 100. It may also be beneficial that cells with the same SI Area ID also belong to the same area of some other type. For example, there may be a requirement or a network operator desire that cells in the same SI Area all belong to the same, e.g., tracking area, routing area, RAN area, RAN Notification Area or some other network area defined by 3GPP. In such scenarios, by having tracking areas larger than or equal to the size of SI Areas, there is no need to handle configuration of unnecessarily complex area relations, e.g., partial overlap between the two area types.

In relation to network node associations, it may simplify the wireless communications network 100 deployment if neighboring cells belonging to the same SI Area are associated with the same network node of a certain type, e.g., mobility management entity or serving gateway. For a cell belonging to a network cluster of cells, such as a Coordinated Multi-Point (CoMP) cluster, it may be important to ensure that cells in the same cluster do not belong to different SI Areas.

These kinds of different SI Area associations of a cell such as e.g. cell 11 increase the likelihood that some SIBs may be useful in many cells in the SI Area. This further simplifies the structure and relations between different area types, node groupings, or network node associations in the wireless communications network 100.

In embodiments where the wireless communications network 100 comprises heterogeneous networks, micro cells may belong to one SI Area with one SI Area ID while macro cells may belong to another SI Area with another SI Area ID.

In one example, selecting a preferred SI Area may be based on, for example, the SI Area of the largest number of neighbor cells, or the SI Area with the largest number of handovers, or the SI area with the most similar neighbor network nodes, e.g., in terms of output power/cell type/ bandwidth/etc. Another criterion for selecting SI Area ID configuration is related to multi-cell SI transmission where it is beneficial if cells have as similar SI as possible.

In an example embodiment, the above kinds of associations are taken into account by a SON method that automatically determines the SI Area ID of cells. Such method may calculate very low utility values, e.g., as low as −infinity ($-\infty$) in case the association is explicitly forbidden, for certain candidate SI Area IDs.

In case the cell 11 provides SI that is valid in multiple cells within the same SI Area, it may be beneficial if the SI of the cell 11 is as similar as possible to the SI of other cells in the same SI Area. Similar SI enables efficient compression of the SI, e.g. in case the serving cell is used as template for the other cell SI thus, for example, only parameters that differ need to be explicitly communicated. Other compression techniques may also be applicable, where these techniques have in common that they reduce the size of a set of data by removing or decreasing the amount of redundant data within the set of data. For instance, when a certain parameter value is repeated in multiple instances, such as an SI parameter value being the same for multiple cells, instead of explicitly repeating the full representation of the same parameter value multiple times, absence of a parameter value or shortened representation of the parameter value may mean that the same value is repeated.

In another embodiment, the network node 110 may e.g. calculate the average SI size in case it selects a certain SI Area. In order to do this, the network node of the first cell 11, in case of a distributed solution, or the O&M system or a centralized or semi-centralized RAN entity, in case of a centralized solution, may preferably obtain the SI of the other cells in the candidate SI Area and calculate the compressed other cell SI for each of them and then compute a sum representing the total size of the resulting multi-cell SI the new cell would have to provide, possibly weighted, e.g. by handover frequency or by using different weights for neighboring and non-neighboring cells.

Alternatively, a network node serving the first cell may calculate the cost for other cells in the SI Area to provide its own SI and then select the SI Area resulting in least cost for the cells already in the area to also provide the SI of this new cell. These two approaches may also be used together, thereby calculating the total resulting cost for the other cells in the SI Area to provide the new cell's SI and the cost for the new cell to provide the SI of the other cells in the SI Area. This combination hence represents what the total cost to provide the total (compressed) multi-cell SI in the SI Area for all cells together will be if the cell joins the SI Area.

Calculation of Utility Function Values

SI Area selection which relate to Action 205, as described above, may depend on several different criteria. In some embodiments, these criteria are captured by defining a utility function as a weighted combination of several factors, e.g.:

$$\begin{aligned}
\text{SI\_Area\_Utility} = (\ &a * \text{SI\_resemblance\_factor} + \\
&b * \text{number\_of\_direct\_neighbours\_factor} + \\
&c * \text{gNB\_type\_factor} + \\
&d * \text{cell\_type\_factor} + \\
&e * \text{SI\_area\_size\_factor} + \\
&f * \text{expected\_handover\_frequency\_factor} + \\
&g * \text{network\_node\_association\_factor} + \\
&h * \text{network\_cluster\_association\_factor} + \\
&i * \text{network\_area\_association\_factor} + \ldots ),
\end{aligned}$$

where $a, b, c, d, e, f, g, h, i$ are the weights that may be configured, for example, in the network node 110. The various factors may themselves be functions whose values are determined based on the entity, measure or property they represent. For example, an SI Area size factor may be a function with a large value for a single cell SI Area, which rather quickly falls, with increasing number of cells in the SI Area, to a plateau, where the function remains approximately constant or slowly declining, until it reaches a point, i.e. a number of cells in the SI Area, where it starts to decline rapidly. This steep decline may be seen as a "soft limit" on the SI Area size.

By calculating the SI Area Utility function values according to embodiments herein, the network node 110 may be able to select the most suitable SI Area and corresponding SI Area ID for a first cell 11 by selecting the SI Area ID resulting in the largest utility.

When a new network node or a new cell is deployed, it may preferably be incorporated in a suitable SI Area. In a distributed embodiment, this involves direct communication between each new cell and its neighbor cells. For neighbor cells served by the same network node, this communication is an internal matter in the network node. For neighbor cells served by other network nodes, the communication takes place between the network nodes across an inter-network node interface, e.g. inter-gNB interface, such as an Xn/X2 interface, or via the core network 104, e.g. via an S1-like interface, e.g. a 5G RAN-CN interface corresponding to S1 interface in LTE or similar, such as Ng in the ongoing 5G standardization in 3GPP.

A consequence of the choice of SI Area such as selecting the respective SI Area ID in Action 205 for a new cell such as the first cell 11 is that the network node 110 serving the first cell must obtain the SI of the other cells in the SI Area and the network nodes serving the other cells in the SI Area shall preferably obtain the SI of the network node 110 or first cell 11 such as e.g. the newly deployed network node or cell. Also updates of the SI of a cell shall preferably be distributed to other cells in the area. With a distributed SI Area ID configuration, all these data exchanges take place through inter-network node interfaces, such as e.g. inter-gNB interfaces or via the core network.

In some centralized embodiments of the method for selecting an SI Area ID for the first cell 11 in the wireless communications network 100, wherein the wireless communications network 110 is a SON, e.g. a method for automatic SI Area ID selection and configuration may be implemented as part of the O&M system, i.e., the O&M system may know which SI Area the newly deployed network node or cell such as the network node 110 and/or the first cell 11 belong to and to which the other cells are in that area and may ensure that all cells in the SI Area have the same or at least very similar multi-cell SI. A network node operating in the O&M system may set SI data in network nodes such as the network node 110 and/or retrieve SI data from network nodes and knows and controls which network nodes or cells that belong to which SI Area.

An alternative to the O&M system, the method for selecting a SI Area ID for the first cell 11 in the wireless communications network 100 such as the method for automatic SI Area configuration may be implemented in a centralized or semi-centralized RAN entity, which may control and/or serve multiple cells, such as a centralized or semi-centralized baseband unit, a so-called Central Unit (CU) in the NR architecture or a network node and/or entity hosting a radio control function.

In some embodiments, the method for SI Area ID selection and configuration may be realized as a hybrid between a fully distributed solution and a fully centralized solution. Different partial tasks, such as identification of potential SI Area ID candidates, retrieval of SI configurations of existing cells in the SI Area and distribution of the new cell's SI configuration to other cells in the SI Area, may be handled in a distributed or centralized manner in various combinations. Below is an example embodiment of a hybrid setting.

Figure 3:
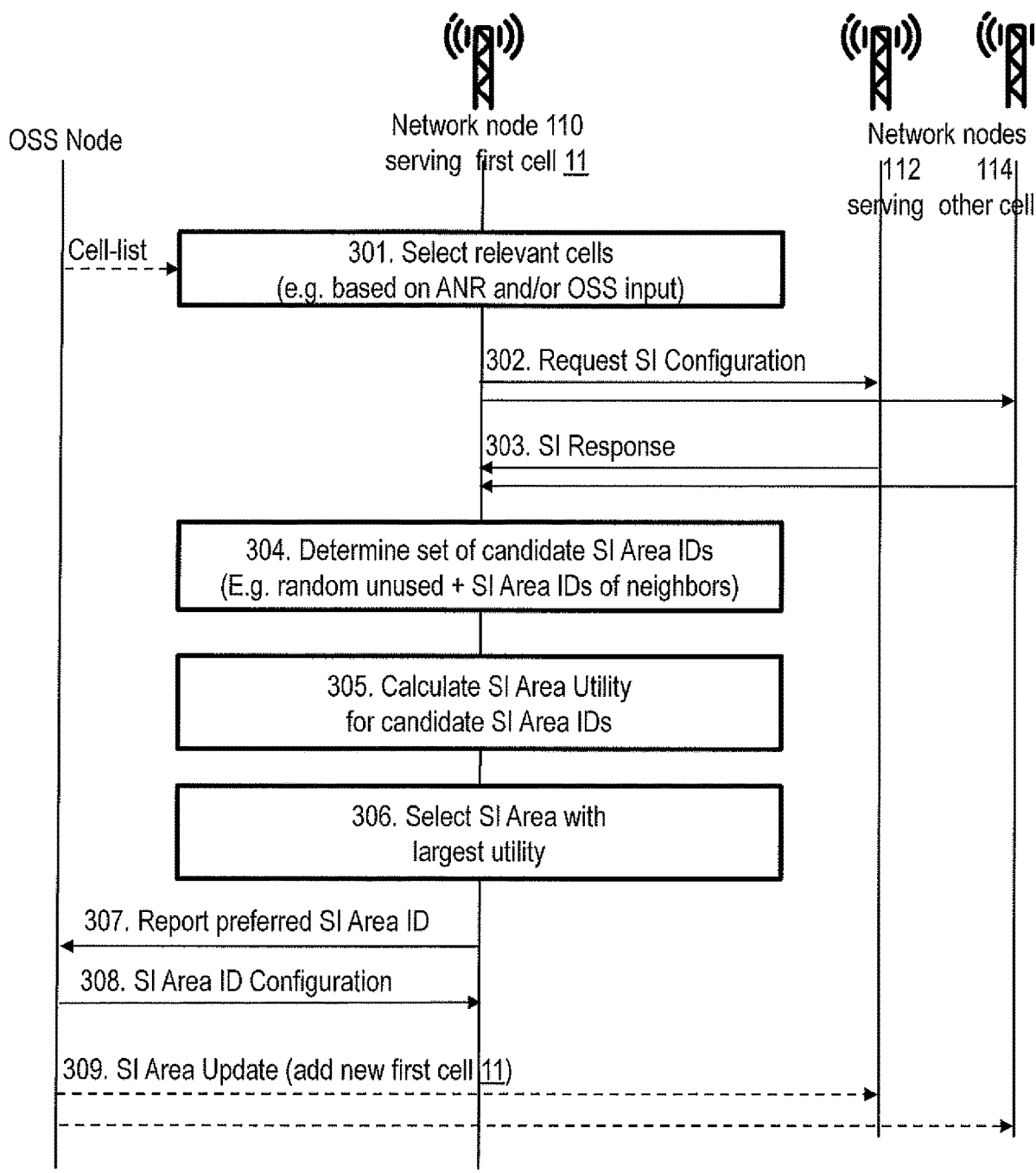
FIG. 3 is a sequence diagram illustrating embodiments of a method in a network node.

An example embodiment depicted in FIG. 3, shows the SI Area ID selection for a newly deployed first cell 11 in an existing wireless communications network 100. It should be noted that communicating with the "other cells" is typically performed between the network node(s) that host the cells and not between the cells directly.

The network node 110 selects 301 a list of cells that are relevant for the SI Area ID determination. For example, this is based on an ANR algorithm or on input from an O&M node, e.g. an OSS node. This relates to Action 201 described above.

In this example, the network node 110 requests 302 and receives 303 the SI configurations from network nodes 112, 114 serving the relevant cells. Such information may as well be provided by the O&M system. This is related to Action 202. The relevant cells in terms of which cells' SI configuration the new first cell 11 needs to know may also be cells that have a neighbor relation to the first cell 11, e.g., direct neighbor or neighbor's neighbor. Detecting and establishing neighbor relations may be performed by an automatic neighbor relation (ANR) procedure or it may be configured manually.

In case network nodes serving all cells in the SI Area know the SI configuration of not only itself but also of all other cells in the SI Area, it may be enough for the network node 110 and/or first cell 11 to retrieve the SI configurations from only one cell in each SI Area that it sees in the list of relevant cells. That gives it information about the SI configurations of all the cells in each SI Area. Note that this is not reflected in FIG. 3.

The first cell 11 then determines 304 a list of candidate SI Area IDs and calculates 305 an SI Area ID Utility, also denoted utility value, for each candidate. This is related to Actions 203 and 204. The SI Area ID with the largest utility is then preferably selected 306. This is related to Action 205. In this example, the selected SI Area ID is reported 307 to an O&M node that may make a final decision and configure 308 the SI Area ID in the first cell 11. If needed, the O&M node may update 309 network nodes serving other cells in the SI Area with the SI configuration of the first cell 11.

Note that even if all the SI parameters of the first cell 11 are the same as in some template cell, the network nodes serving the other cells in the SI Area may preferably be updated with the global cell ID of the first cell 11. If the SI of different cells in the multi-cell SI are indexed by the PCI and not the global cell ID, then also the PCI of the first cell 11 needs to be conveyed to the network nodes serving the other cells in the SI Area.

When a new cell such as e.g. the first cell 11 is added to an existing wireless communications network 100, it is either joining an existing SI Area ID or it creates a new SI Area ID. In many cases, the first cell 11 begins to operate successfully in the wireless communications network 100. However, there may also be cascading effects in the network as a result.

It is noted that if a cell temporarily is associated with a non-optimum SI Area ID, this is not a large problem. Situations may occur where multiple simultaneous changes in the network interplay in a chaotic fashion that is difficult to predict. This needs to be taken care of automatically in due time. But it is not necessary to always operate with optimum configuration of SI Area IDs in every cell in the network at every time instance. Simple, slow, and robust solutions are good enough.

To react to changes in the network each cell's network node may periodically, e.g., once every 15 minutes, evaluates the cell's SI Area membership. Optionally, such an evaluation may in addition be triggered by significant changes the network node becomes aware of, e.g. SI updates significantly affecting the total size of the SI, new cells joining the SI Area, etc. The rule for this option may be that if the network node is made aware of a change which will decrease the current SI Area's utility for one of the network node's cells, then this may trigger the network node to evaluate the SI Area membership for the concerned cell.

In some embodiments, a distributed implementation of automatic determination of SI Area configuration may need to be capable of handling race conditions, e.g. when two or more cells are deployed in parallel. It is also favorable if the cells in an SI Area may synchronize their notion of which other cells that are members of the same SI Area, even in the presence of dynamic events like cells joining or leaving the SI Area.

One way to address these issues is to introduce "modification periods for SI Area ID updates". For example, the SI Area ID changes may be allowed only at specific times, spaced by so called modification windows, e.g. sequentially following each other without gaps, and any cell that wishes to change SI Area ID must distribute information about this to the network nodes of all other cells in the affected SI Areas, which includes both the current SI Area and the planned new SI Area in case of a cell changing from one SI Area to another, at least one modification period in advance. The distribution may be handled through forwarding over inter-network node interfaces, e.g. inter-gNB interfaces, e.g. Xn interfaces. An alternative is that the distribution may be handled through a central entity, e.g. an O&M system node or a centralized or semi-centralized RAN node or a coordination entity. The notion of a modification window/period fits well with the modification period concept used for updates of SI. Since a cell that joins or leaves an SI Area causes changes in the compound multi-cell SI for the SI Area, which implies SI updates in the provided SI of all cells in the SI Area since all cells in the SI Area provide the same multi-cell SI, the SI modification periods may be used also for SI Area ID updates and in addition the SI Area ID is de facto a part of the SI of a cell. This means that SI Area ID updates and resulting SI updates may be handled together as a unified operation. If two or more cells announce upcoming SI Area ID changes in a way that impact a certain SI Area in the same modification period, then the network nodes of all cells in the SI Area will become aware of both upcoming changes and may change the multi-cell SI accordingly at the time of execution of the changes.

A potential consequence of such simultaneous SI Area ID changes is that the result may become suboptimal, e.g. if one of the changing cells had been aware of the other cell's planned change before planning its own change, its SI Area membership evaluation might have produced another result, e.g. not to change. This issue may be mitigated by enabling the SI Area membership evaluation to take other planned changes into account. This may be facilitated by separating the tasks of determining which SI Area ID a cell should belong to and the task of executing the desired SI Area ID change in the network. The SI Area ID change may be delegated to a sub-routine that ensures that the changes occur in a proper order at proper time instances. As soon as an SI Area ID change is decided (but not yet executed) the information about the change may be distributed to other cells such that they may evaluate their own SI Area ID association with this new input information without having to wait for the change to occur first.

Other ways to deal with the potential issues of simultaneously planned SI Area ID changes is to introduce priority rules, ensuring that only a single cell may change SI Area ID in a manner that impacts the same SI Area ID in the same modification period. This will be further described below in addition to another way where it is elaborated how to mitigate potential negative consequences by introducing a random minimum interval that must pass between two consecutive SI Area changes in the same cell.

Multiple parallel SI Area ID changes in different cells affecting the same SI Area may result in temporarily suboptimal SI Area configurations. These suboptimal configurations will be improved in time through repeated SI Area membership evaluations, for example, using utility function value calculations, in all cells. However, even though the consequences of parallel, conflicting SI Area ID changes are not crucial, it may be preferable to avoid them.

In order to avoid SI Area ID update conflicts where several cells in a local vicinity want to change SI Area ID at the same time, affecting the same SI Area, a priority rule that decides which cell that may execute the SI Area ID change first is introduced. Below are several examples of such priority rules.

In one embodiment, the cell timestamps when it decided that it wanted to change SI Area ID and only the cell with the earliest timestamp may change SI Area ID in this modification period. The timestamp may be included in the information about the planned change when it is distributed to the network nodes of the other cells in the affected SI Area(s).

Another embodiment is when the cell with the largest utility, or largest positive utility change, associated with the new SI Area ID may change in this modification period. To support this, the calculated utility change of the planned SI Area ID change may be included in the information about the planned change when it is distributed to the network nodes of the other cells in the affected SI Area(s).

Certain cells may have absolute priority over other cells, e.g. macro cells take priority over small cells in case multiple simultaneous SI Area ID updates are requested. If multiple prioritized cells are involved in an SI Area ID change conflict, i.e. the highest prioritized cell is not the only cell with this priority that announces a planned change, then one of the other priority rules described herein may be used to appoint one of them to be allowed to change in the modification period. Some indication of the priority (explicit or implicit) may be included in the information about the planned change when it is distributed to the network nodes of the other cells in the affected SI Area(s).

In an embodiment, each cell draws a random number and only the cell with the largest (or smallest) number may change SI Area ID in this modification period. The random number may be included in the information about the planned change when it is distributed to the network nodes of the other cells in the affected SI Area(s). One of the other priority rules described herein may be used to resolve cases where two or more cells generate the same random number.

A central node is responsible for SI Area ID change coordination and to ensure that only one cell change, i.e. a cell that joins or leaves, occurs in the same SI Area in the same modification period. Before changing SI Area ID, a cell, i.e. the network node of the cell, needs to acquire permission to do so from the coordination node. The central SI Area ID change coordination node may use any of the rules listed above or a combination of them to select which cell that may proceed with its planned change. An additional such priority rule that may be used by a coordination node is to grant the first change request it receives affecting a certain SI Area during a certain modification period and reject any subsequent change requests affecting the same SI Area during the same modification period. All network nodes in the affected SI Area(s) may be informed about the coordination node's decision, so that the network nodes may modify the multi-cell SI in their affected cells accordingly.

In another embodiment, a random generator determines which cell may proceed with the SI Area ID change in-case of conflicts. A difference from the above described random number priority rule is that with this rule, all network nodes with cells in an affected SI Area generates the same random result and therefore all arrive at the same conclusion of which cell that is allowed to change. To achieve this, all network nodes may use the same input to the random generator. An example of input data that fulfills this may be to use the cell ID (e.g. the global cell ID) of a cell that has announced a planned change and the system frame number of the start of the modification period when the change is planned to be executed. Another example of input data may be the bit string formed by the information constituting the announced planned change for a cell. With these examples of input data, each affected network node may generate a random number for each of the cells which have announced planned changes by feeding the input data associated with the cell into a random number generator and then the greatest (or smallest) resulting random number determines which cell that is allowed to proceed with the change. If this random generation process does not produce a single "winner" (e.g. two or more cells get the same highest random number), any of the other priority rules described herein could be used to resolve the conflict.

One possible consequence of suboptimal configurations arising from parallel conflicting SI Area ID changes is that oscillating behavior may arise. If, for instance, two cells simultaneously decide to join the same SI Area and both do so. Then, both of them (as well as other cells in the SI Area) may realize that the SI Area is now so large (or its utility value may have decreased for other reasons) that it would be better to join the neighbor area and two or more cells do so and then they soon come back, because their leaving recreated the original situation, etc. Such an oscillating behavior requires that the cells are synchronized in their SI Area evaluations. In one embodiment, this may be avoided with a rule stating that the network node of a cell has to let a certain time pass after an SI Area ID change in one of its cells until it may perform another change and this time period should be randomly chosen between $T_{min}$ and $T_{max}$. Provided that the time period range, i.e. $T_{max}-T_{min}$, is long in relation to the length of a modification period, the probability that the network nodes of two cells performing parallel conflicting SI Area ID changes which discover that a suboptimal configuration arose, would choose the same modification period for the next SI Area ID change and then the impact of the SI Area ID change of the cell using the shortest inter-change interval (i.e. the change of the utility value) would be visible to the network node of the second cell before it has a chance to change the second cell's SI Area ID and this network node will then conclude that the SI Area ID change is no longer needed.

Adding one new cell into an existing network may be handled using the methods described above. Below are some further embodiment describing how to deal with the initial stages of network deployment. This is e.g. the case for the distributed scenario.

The first network node to be deployed in a network (or in location where it is isolated from the rest of the network) of course has no choice but has to form an initial trivial SI Area (unless the network node wants to distribute its different cells to different SI Areas). The second network node would then only have neighbors in one SI Area and would then choose to either join that SI Area or form a new one. In order to avoid that SI Areas become too large we may introduce a possibly "soft" limit for the number of network nodes/cells in an SI Area before a newly deployed network node determines that it has to form a new SI Area. A soft limit here refers to a limit that is not absolute, but may be exceeded if this would give other advantages that outweigh the negative impact of the increased SI Area size, e.g. as indicated by a utility function. Similarly, taking other aspects into account, e.g. through a utility function, may result in that the growth of an SI Area is stopped before the soft limit is reached. Note that the network node that ensures that SI Area does not grow too big in terms of number of network nodes/cells does not have to be newly deployed. A new network node or cell may be deployed in the middle of an existing SI Area and has no other reasonable choice but to join this SI Area. But if the (possibly soft) limit for the number of network nodes/cells is exceeded because of this, another network node with a cell at the border of the SI Area may take action and e.g. switch (one, some or all of its cells) to a neighboring SI Area.

Figure 4:
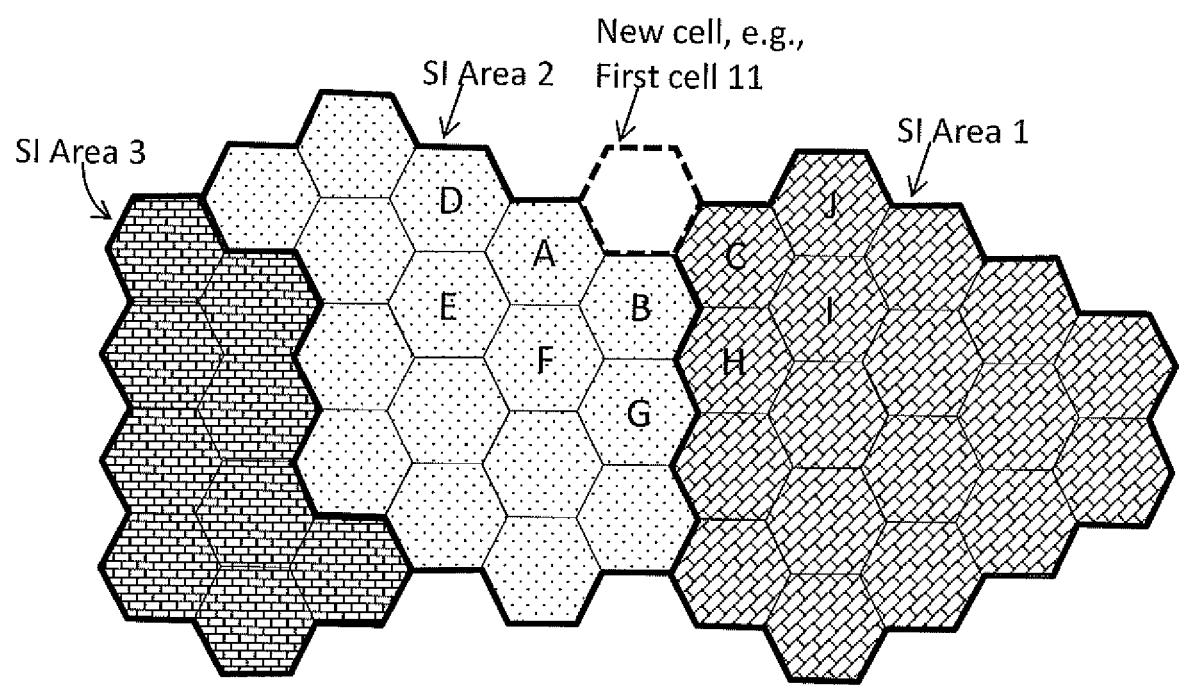
FIG. 4 is a schematic block diagram illustrating embodiments of a wireless communications network.

In one example where the so far deployed network nodes all belong to the same (and so far only) SI Area, the (possibly soft) limit for the number of network nodes/cells in a SI Area is assumed to be N. When the network node/cell number N+1 is deployed, it may determine that a new SI Area is needed. At this point, the SI Area configuration is suboptimal from a network perspective, with N network nodes/cells in one SI Area and only one network node/cell in another SI Area. In this situation, the distributed SON procedure may rather form two equally sized SI Areas. In one embodiment, this may be achieved by having suitable rules for network nodes with SI Area border cells such that network nodes/cells bordering with the new SI Area should start to migrate to this new and much smaller area and this may continue until the SI Areas are of approximately equal size. This continuous adaptation would go on simultaneously as new network nodes/cells area deployed. FIG. 4 depicts an example deployment of a new cell, i.e. the first cell 11, in a wireless communications network comprising three SI Areas, i.e., SI Area 1, SI Area 2, SI Area 3. Such deployment of the first cell 11 may cause secondary effects in re-evaluating SI Area border cells. For instance, if the network node 110 serving a new cell selects a new SI Area ID and thus forms a new SI Area, then neighboring cells A, B or C may choose to join the new SI Area. This in turn may cause other cells, which turn into SI Area border cells, to re-evaluate their SI Area memberships. For instance, cells F, G and H or cells D and J may choose to join the new SI Area.

Figure 5:
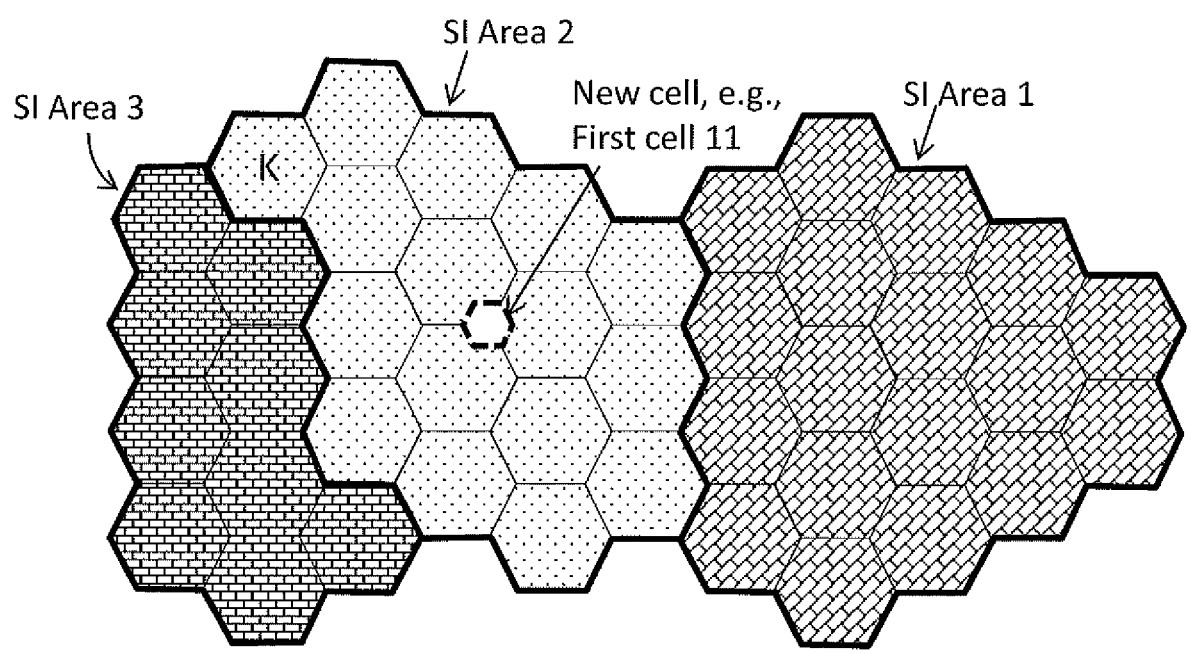
FIG. 5 is another schematic block diagram illustrating embodiments of a wireless communications network.

Furthermore, FIG. 5 depicts an example of a newly added cell to SI Area 2 which may cause secondary effects in re-evaluating SI Area border cells. For instance, cell K may choose to join SI Area 3. The area size limit should preferably be soft, because other criteria should of course be considered too, such as number of handovers across cell borders and/or similarities in SI configuration.

Figure 6:
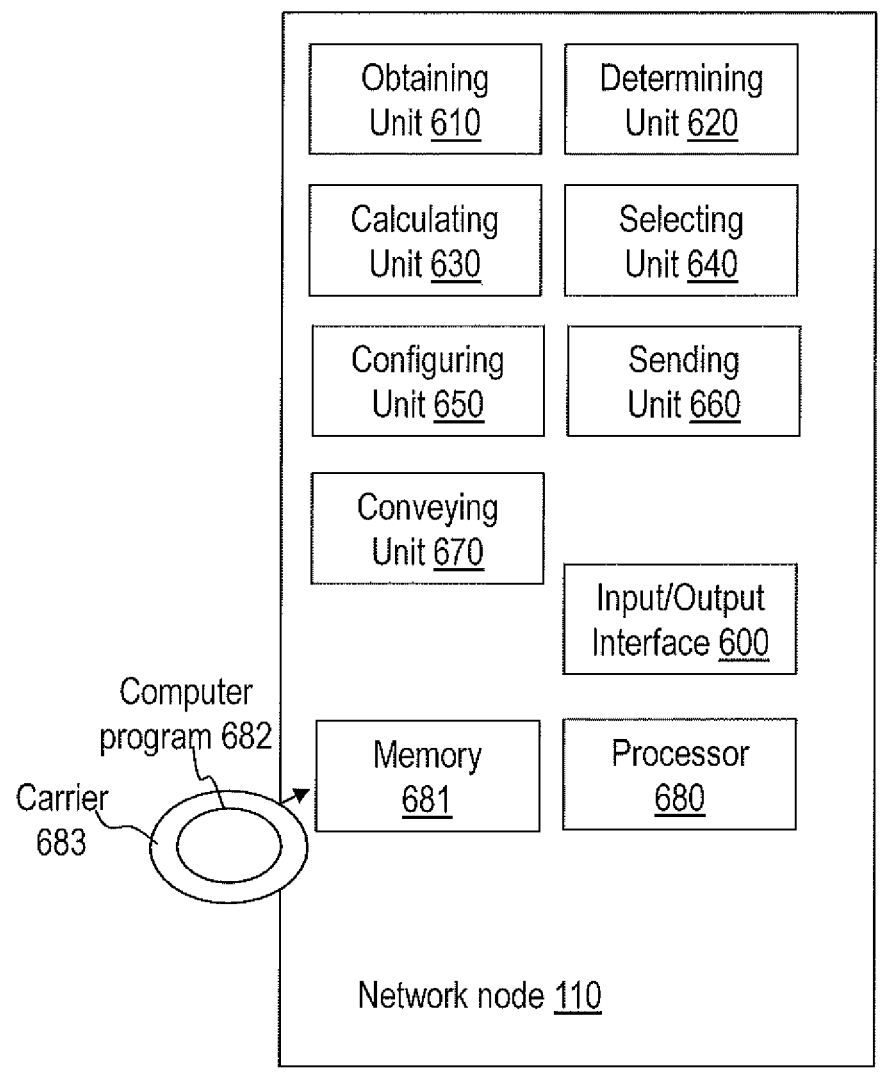
FIG. 6 is a schematic block diagram illustrating embodiments of a network node.

To perform the method actions for selecting an SI Area ID for a first cell 11 in a wireless communications network 100, the network node 110 may comprise the following arrangement depicted in FIG. 6.

The network node 110 comprises an input and output interface 600 configured to communicate with any one of: other network nodes, any core network node, and with one or more UEs such as the UE 120. The input and output interface 600 may comprise a receiver (not shown) and a transmitter (not shown).

The network node 110 is configured to, e.g. by means of an obtaining unit 610 configured to, obtain information about SI configurations of one or more respective cells in a set of cells relevant to the first cell 11.

The network node 110 is configured to, e.g. by means of a determining unit 620 configured to, determine a set of candidate SI Area IDs for the first cell 11.

In some embodiments, the set of candidate SI Area IDs for the first cell 11 is adapted to comprise SI Area IDs associated with the cells relevant to the first cell 11 and other unused SI Area IDs.

In other embodiments, the set of candidate SI Area IDs for the first cell 11 is adapted to comprise SI Area IDs of cells having a neighbour relation with the first cell 11.

The network node 110 is configured to, e.g. by means of a calculating unit 630 configured to, calculate a value of a utility function for each respective SI Area ID candidate in the set of candidate SI Area IDs based on the obtained information about the SI configurations of the one or more respective cells in the set of cells relevant to the first cell 11.

In some embodiments, the utility function that is used for calculating a utility value for each respective SI Area ID candidate in the set of candidate SI Area IDs, is adapted to have input parameters in the form of a weighted combination of factors and/or terms comprising one or more of:

a measure of SI resemblance between the first cell 11 and the set of cells relevant to the first cell 11 having the same SI Area ID, number of direct neighbours to the first cell 11, cell types, expected handover frequency, measures related to the association of the first cell 11 in relation to areas of the wireless communications network 100, and measures related to the association of the first cell 11 in relation to network nodes other than the network node 110 of the wireless communications network 100.

The network node 110 is configured to, e.g. by means of a selecting unit 640 configured to, select an SI Area ID for the first cell 11 from the set of candidate SI Area IDs based on the calculated utility function values, which selected SI Area ID is for configuration of the first cell 11.

In some embodiments, the network node 110 is further configured to, e.g. by means of an obtaining unit 610 configured to, obtain information about the set of cells that are relevant to the first cell 11, from any one out of: the network node 110 itself, and other network nodes.

In some embodiments, the network node 110 is further configured to, e.g. by means of a configuring unit 650 configured to, configure the first cell 11 with the selected SI Area ID.

In some embodiments, the network node 110 is further configured to, e.g. by means of a sending unit 660 configured to, send information about the selected SI Area ID for the first cell 11 to one or more of the cells relevant to the first cell 11.

In some embodiments, the network node 110 is further configured to, e.g. by means of an obtaining unit 610 configured to, obtain SI configuration of the first cell 11. In some embodiments, the network node 110 is further configured to, e.g. by means of a conveying unit 670 configured to, convey information about the SI configuration of the first cell 11 to one or more network nodes wherein each of the one or more network nodes serves at least one cell having the same SI Area ID as the selected SI Area ID.

In some embodiments, the information about the SI configuration of the first cell 11 is further adapted to comprise a command to forward the information to one or more network nodes wherein each of the one or more network nodes serves at least one cell having the same SI Area ID as the selected SI Area ID.

The embodiments herein for SI Area ID selection for a first cell 11 in a wireless communications network 100, may be implemented through one or more processors, such as a processor 680 of a processing circuitry in the network node 110 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 681 comprising one or more memory units. The memory 681 comprises instructions executable by the processor 680. The memory 681 is arranged to be used to store, e.g., information about the set of cells that are relevant to the first cell, SI configurations of cells in a set of cells relevant to the first cell, the set of candidate SI Area IDs for the first cell, in order to perform the methods herein when being executed in the network node 110.

In some embodiments, a computer program 682 comprises instructions, which when executed by the at least one processor 680, cause the at least one processor 680 to perform actions according to any of the Actions 201-209.

In some embodiments, a carrier 683 comprises the computer program 682, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the units in the network node 110, described above may refer to a combination of analog and digital circuits, and/or one or more processors configured with software and/or firmware, e.g. stored in the memory 681, that when executed by the one or more processors such as the processor 680 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Further Extensions and Variations

Figure 7:
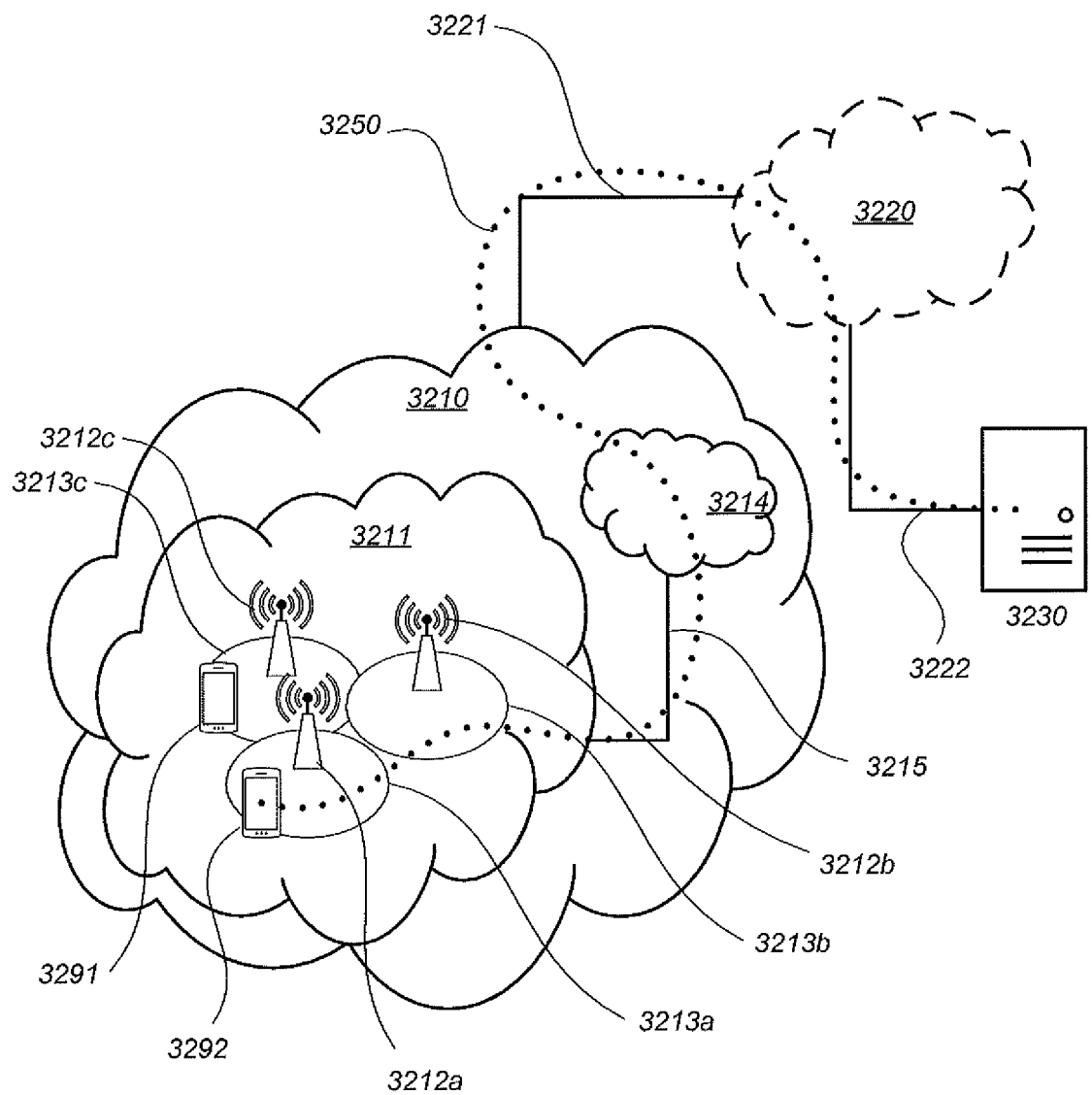
FIG. 7 schematically illustrates a telecommunication network connected via an intermediate network to a host computer.

With reference to FIG. 7, in accordance with an embodiment, a communication system includes a telecommunication network 3210 such as the wireless communications network 100, e.g. a WLAN, such as a 3GPP-type cellular network, which comprises an access network 3211, such as a radio access network, and a core network 3214. The access network 3211 comprises a plurality of base stations 3212a, 3212b, 3212c, such as the network node 110, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the wireless device 120 such as a Non-AP STA 3291 located in coverage area 3213c is configured to wirelessly connect to, or be paged by, the corresponding base station 3212c. A second UE 3292 e.g. the UE 120 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 7 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8) served by the base station 3320. The communication interface 3326 may be configured to facilitate a connection 3360 to the host computer 3310. The connection 3360 may be direct or it may pass through a core network (not shown in FIG. 8) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 8 may be identical to the host computer 3230, one of the base stations 3212a, 3212b, 3212c and one of the UEs 3291, 3292 of FIG. 7, respectively. This is to say, the inner workings of these entities may be as shown in FIG. 8 and independently, the surrounding network topology may be that of FIG. 7.

Figure 8:
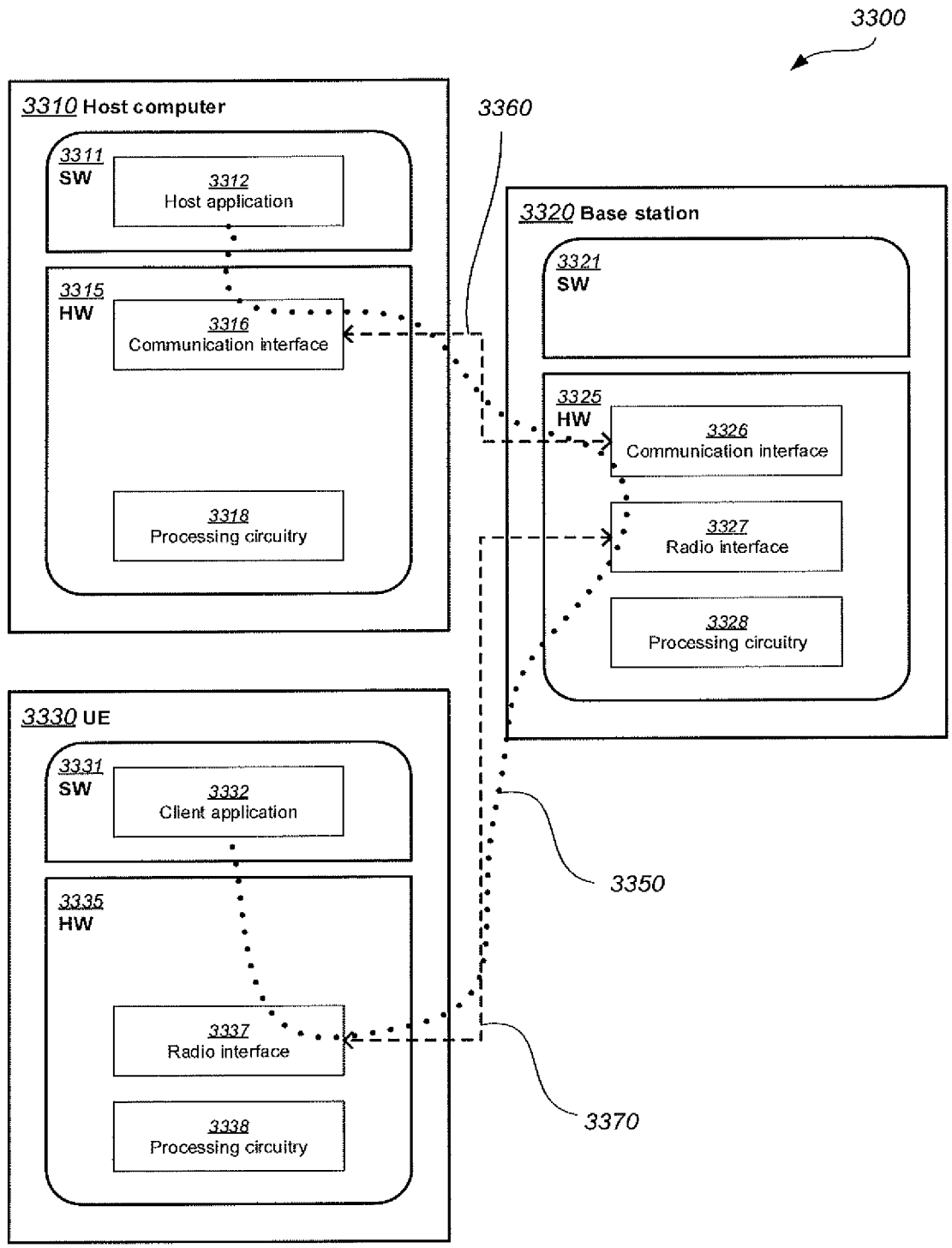
FIG. 8 is a generalized block diagram of a host computer communicating via a base station with a user equipment over a partially wireless connection.

In FIG. 8, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 9:
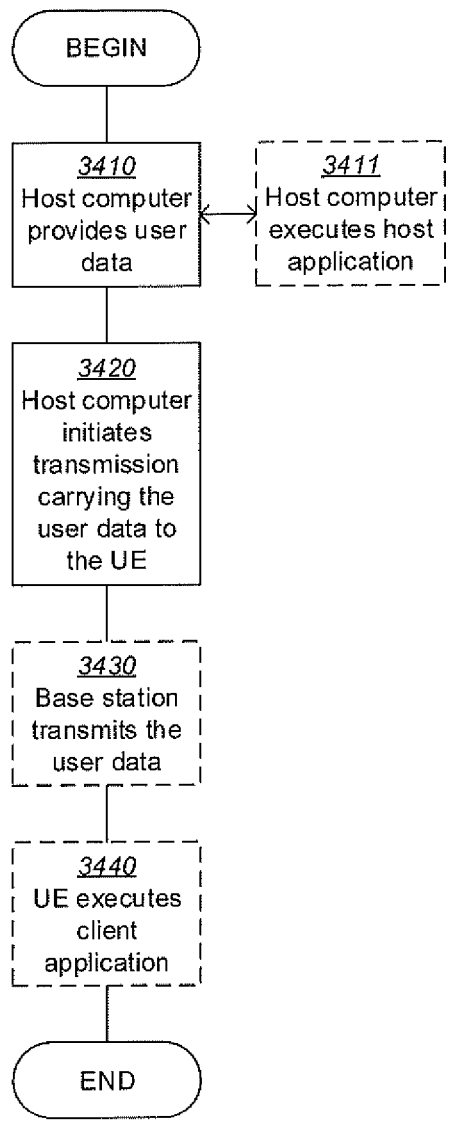
Figure 10:
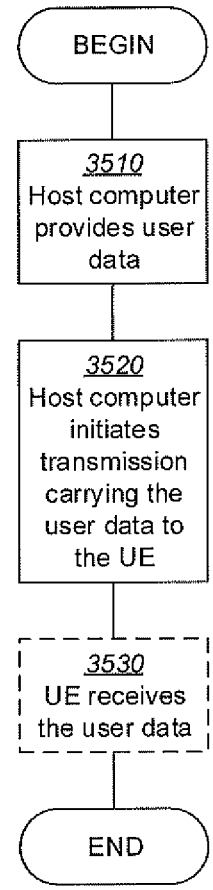

FIGS. 9 and 10 and the corresponding text are about a downstream aspect of the radio-related invention, while FIGS. 11 and 12 and the corresponding text discuss an upstream aspect.

FIG. 9 is a flowchart illustrating a method implemented in a communication system, in accordance with one embodiment. The communication system includes a host computer, a base station such as a AP STA, and a UE such as a Non-AP STA which may be those described with reference to FIGS. 7 and 8. For simplicity of the present disclosure, only drawing references to FIG. 9 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 10 is a flowchart illustrating a method implemented in a communication system, in accordance with one embodiment. The communication system includes a host computer, a base station such as a AP STA, and a UE such as a Non-AP STA which may be those described with reference to FIGS. 7 and 8. For simplicity of the present disclosure, only drawing references to FIG. 10 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 11 is a flowchart illustrating a method implemented in a communication system, in accordance with one embodiment. The communication system includes a host computer, a base station such as a AP STA, and a UE such as a Non-AP STA which may be those described with reference to FIGS. 7 and 8. For simplicity of the present disclosure, only drawing references to FIG. 11 will be included in this section. In an optional first action 3610 of the method, the UE receives input data provided by the host computer. Additionally, or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station such as a AP STA, and a UE such as a Non-AP STA which may be those described with reference to FIGS. 7 and 8. For simplicity of the present disclosure, only drawing references to FIG. 12 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

Abbreviation Explanation

3GPP $3^{rd}$ Generation Partnership Project
5G $5^{th}$ Generation
AMF Access and Mobility Function
ANR Automatic Neighbor Relation
CN Core Network
CoMP Coordinated Multipoint
CU Central Unit
eNB Evolved Node B
FDD Frequency Division Duplex
gNB The term used for a radio base station in 5G/NR.
ID Identity/Identifier
LTE Long Term Evolution
MME Mobility Management Entity
MIB Master Information Block
Msg Message
NB Narrowband
NB-IoT NB Internet of Things
NR New Radio (The term used for the 5G radio interface and radio access network in the technical reports and standard specifications 3GPP are working on.)
O&M Operation and Maintenance
OSS Operations Support System
OTT Over-the-top
PCI Physical Cell Identity
RAN Radio Access Network
RAT Radio Access Technology
RRM Radio Resource Management
S1 The interface between the RAN and the core network in EPS/LTE.
SI System Information
SIB System Information Block
SON Self-Organizing Network/Self-Optimizing Network
UE User Equipment
X2 The interface between two radio base stations (eNBs) in LTE.
Xn The interface between two radio base stations (gNBs) in NR.

The invention claimed is:

1. A method performed by a network node for selecting a System Information Area Identity, SI Area ID, for a first cell in a wireless communications network, the method comprising:
obtaining information about SI configurations of one or more respective cells in a set of cells relevant to the first cell;
determining a set of candidate SI Area IDs for the first cell;
calculating a value of a utility function for each respective SI Area ID candidate in the set of candidate SI Area IDs based on the obtained information about the SI configurations of the one or more respective cells in the set of cells relevant to the first cell; and selecting an SI Area ID for the first cell from the set of candidate SI Area IDs based on the calculated utility function values, which selected SI Area ID is for configuration of the first cell.

2. The method according to claim 1, further comprising obtaining information about the set of cells that are relevant to the first cell, from any one out of: the network node itself, and other network nodes.

3. The method according to claim 1, wherein the set of candidate SI Area IDs for the first cell, comprises SI Area IDs associated with the cells relevant to the first cell and other unused SI Area IDs.

4. The method according to claim 1, wherein the set of candidate SI Area IDs for the first cell, comprises SI Area IDs of cells having a neighbour relation with the first cell.

5. The method according to claim 1, wherein the utility function that is used for calculating a utility value for each respective SI Area ID candidate in the set of candidate SI Area IDs, has input parameters in the form of a weighted combination of factors and/or terms comprising one or more of:
- a measure of SI resemblance between the first cell and the set of cells relevant to the first cell having the same SI Area ID,
- number of direct neighbours to the first cell,
- cell types,
- expected handover frequency,
- measures related to the association of the first cell in relation to areas of the wireless communications network, and
- measures related to the association of the first cell in relation to network nodes other than the network node of the wireless communications network.

6. The method according to claim 1, further comprising configuring the first cell with the selected SI Area ID.

7. The method according to claim 1, further comprising sending information about the selected SI Area ID for the first cell to one or more of the cells relevant to the first cell.

8. The method according to claim 1, further comprising obtaining SI configuration of the first cell, and
conveying information about the SI configuration of the first cell to one or more network nodes wherein each of the one or more network nodes serves at least one cell having the same SI Area ID as the selected SI Area ID.

9. The method according to claim 8, wherein the information about the SI configuration of the first cell further comprises a command to forward the information to one or more network nodes wherein each of the one or more network nodes serves at least one cell having the same SI Area ID as the selected SI Area ID.

10. A non-transitory computer readable medium having software instructions stored therein, which when executed by a processor, causes the processor to perform actions according to claim 1.

11. A network node for selecting a System Information Area Identity, SI Area ID, for a first cell in a wireless communications network, wherein the network node is configured to:
obtain information about SI configurations of one or more respective cells in a set of cells relevant to the first cell;
determine a set of candidate SI Area IDs for the first cell;
calculate a value of a utility function for each respective SI Area ID candidate in the set of candidate SI Area IDs based on the obtained information about the SI configurations of the one or more respective cells in the set of cells relevant to the first cell; and
select an SI Area ID for the first cell from the set of candidate SI Area IDs based on the calculated utility function values, which selected SI Area ID is for configuration of the first cell.

12. The network node according to claim 11, further being configured to obtain information about the set of cells that are relevant to the first cell, from any one out of: the network node itself, and other network nodes.

13. The network node according to claim 11, wherein the set of candidate SI Area IDs for the first cell, is adapted to comprise SI Area IDs associated with the cells relevant to the first cell and other unused SI Area IDs.

14. The network node according to claim 11, wherein the set of candidate SI Area IDs for the first cell, is adapted to comprise SI Area IDs of cells having a neighbour relation with the first cell.

15. The network node according to claim 11, wherein the utility function that is used for calculating a utility value for each respective SI Area ID candidate in the set of candidate SI Area IDs, is adapted to have input parameters in the form of a weighted combination of factors and/or terms comprising one or more of:
- a measure of SI resemblance between the first cell and the set of cells relevant to the first cell having the same SI Area ID,
- number of direct neighbours to the first cell,
- cell types,
- expected handover frequency,
- measures related to the association of the first cell in relation to areas of the wireless communications network, and
- measures related to the association of the first cell in relation to network nodes other than the network node of the wireless communications network.

16. The network node according to claim 11, further being configured to
configure the first cell with the selected SI Area ID.

17. The network node according to claim 11, further being configured to
send information about the selected SI Area ID for the first cell to one or more of the cells relevant to the first cell.

18. The network node according to claim 11, further being configured to
obtain SI configuration of the first cell, and
convey information about the SI configuration of the first cell to one or more network nodes wherein each of the one or more network nodes serves at least one cell having the same SI Area ID as the selected SI Area ID.

19. The network node according to claim 18, wherein the information about the SI configuration of the first cell is further adapted to comprise a command to forward the information to one or more network nodes wherein each of the one or more network nodes serves at least one cell having the same SI Area ID as the selected SI Area ID.

* * * * *